United States Patent
Pullen et al.

(10) Patent No.: US 7,613,133 B2
(45) Date of Patent: Nov. 3, 2009

(54) METHOD, SYSTEM AND COMPUTER PROGRAM PRODUCT FOR PROCESSING PACKETS AT FORWARDER INTERFACES

(75) Inventors: David M Pullen, Suwanee, GA (US); Richard Schwartz, San Diego, CA (US); Kevin E O'Neal, Suwanee, GA (US); John McQueen, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 842 days.

(21) Appl. No.: 10/379,801

(22) Filed: Mar. 6, 2003

(65) Prior Publication Data
US 2004/0174878 A1  Sep. 9, 2004

(51) Int. Cl.
*H04L 12/28* (2006.01)
(52) U.S. Cl. .................................. 370/256; 370/401
(58) Field of Classification Search ................. None
See application file for complete search history.

(56) References Cited

U.S. PATENT DOCUMENTS

| | | | |
|---|---|---|---|
| 6,446,131 B1 * | 9/2002 | Khansari et al. | 709/238 |
| 6,937,576 B1 * | 8/2005 | Di Benedetto et al. | 370/256 |
| 7,061,875 B1 * | 6/2006 | Portolani et al. | 370/256 |
| 7,113,487 B1 * | 9/2006 | Johnson et al. | 370/255 |
| 2003/0081624 A1 * | 5/2003 | Aggarwal et al. | 370/412 |
| 2004/0184401 A1 * | 9/2004 | Nguyen et al. | 370/216 |
| 2004/1017488 * | 9/2004 | Pullen et al. | 370/395.42 |
| 2005/0138008 A1 * | 6/2005 | Tsillas | 707/3 |

OTHER PUBLICATIONS

IEEE Std 802.s, IEEE Standards for Local and Metropolitan Area Networks: Virtual Bridged LAN—Multiple Spanning Trees, 2002, pp. cover.*

Insolvibile, G., "Kernel Korner: Inside the Linux Packet Filter"[online], Linux Journal—The Premier Magazine of the Linux Community, Feb. 2002 [retrieved on Apr. 16, 2003]. Retrieved from the Internet: <URL:http//www.linuxjouranl.com/article.php?sid=4852> (7 pages).

(Continued)

*Primary Examiner*—Jayanti K Patel
*Assistant Examiner*—Jung Park
(74) *Attorney, Agent, or Firm*—Sterne, Kessler, Goldstein & Fox P.L.L.C.

(57) ABSTRACT

A system and method for processing information transport elements, such as ethernet packets, at interfaces to a forwarder. Modules that implement processing logic are allocated per interface and per direction (i.e., inbound or outbound). At any given interface, a series of modules would be used to process inbound packets; likewise, a set of modules would be used to process outbound packets. For inbound packets, the modules allocated for inbound processing are executed when the packet is received from the interface, before sending the packet on to the forwarder. For packets that are outbound from the forwarder, the modules allocated for outbound processing are applied when the packet is sent by the forwarder, prior to any other processing, e.g., queuing to hardware. To assign modules to different interfaces at a forwarder, a registration process is performed during the system start-up process, or dynamically at runtime. For any given interface and direction, modules can be prioritized, so that a packet is processed sequentially in a specific order, one module after the other.

16 Claims, 7 Drawing Sheets

OTHER PUBLICATIONS

Insolvibile, G., "Kernel Korner: Inside the Linux Packet Fiter, Part II" [online], Linux Journal—The Premier Magazine of the Linux Community, Mar. 2002 [retrieved on Apr. 16, 2003]. Retrieved from the Internet: <URL1: http://www.linuxjournal.com/article.php?sid=5617> (6 pages).

* cited by examiner

METHOD, SYSTEM AND COMPUTER PROGRAM PRODUCT FOR PROCESSING PACKETS AT FORWARDER INTERFACES

CROSS-REFERENCE TO RELATED APPLICATIONS

Not applicable.

STATEMENT REGARDING FEDERALLY-SPONSORED RESEARCH AND DEVELOPMENT

Not applicable.

REFERENCE TO MICROFICHE APPENDIX/SEQUENCE LISTING/TABLE/COMPUTER PROGRAM LISTING APPENDIX (Submitted on a Compact Disc and an Incorporation-by-reference of the Material on the Compact Disc)

Not applicable.

BACKGROUND OF THE INVENTION

1. Field of the Invention

The invention described herein relates to data networks, and in particular relates to packet processing.

2. Related Art

Any modern data network of appreciable size includes one or more devices whose job it is to relay information (e.g., ethernet packets) from one interface to another. Such devices include switches, routers, or any layer two bridge. Such devices will be referred to herein generically as forwarders. A forwarder will typically have multiple interfaces. This allows the forwarder to send and receive data over multiple connections. Each interface may have its own unique processing requirements. Different connections may require different communications media, different protocols and different data formats. Different connections may also require different operations such as cryptographic processing or error detection and correction. Moreover, the processing at different interfaces may be dependent on the options and features provided by specific equipment manufacturers or service providers.

An example of such a forwarder is illustrated in FIG. 1. Forwarder 110 has four different interfaces in this example. Interface 120 is an interface to an ethernet local area network (LAN). Interface 130 is a universal serial bus (USB) interface. Interface 140 represents a wireless 802.11 connection. Interface 150 represents a connection to a wide area network (WAN).

The processing required can vary from interface to interface for a variety of reasons. Processing may depend on the routing of data through the forwarder. For example, if data is entering forwarder 110 from LAN interface 120 for eventual transmission through WAN interface 150, certain operations may need to be performed on the data at interface 120. If, however, data enters forwarder 110 through LAN interface 120 and is bound for 802.11 interface 140, a different set of operations may be required at interface 120, or possibly the same set of operations in a different order. Specific processing at an interface may also vary based on the content of the data. A specific IP header, for example, may dictate a specific action. Specific data fields in the data packet may have to be manipulated, e.g. an address field or type of service bits.

Given the variety of processing that may be required at different interfaces, one solution might be to make all such processing available at all interfaces. A single generic interface module would then be available at every interface. This is inefficient for several reasons. Generally, not all of the processing is required for every circumstance. Some processing is never needed at a specific interface; other processing may be needed only conditionally, depending on the source and destination, on specific data fields, or on a specific system context, etc. Implementing a single generic interface software module therefore represents more logic than is necessary. Memory would be consumed for software that may not be needed. Software maintenance would also be unnecessarily complicated. Execution of a generic interface module would consume excessive CPU resources.

Moreover, implementation of a generic interface module could create management issues with respect to vendor proprietary information. Features may have to be built into the interface software module to accommodate one or more features offered by a specific vendor. Yet, given the proprietary nature of the resulting software, distribution of the software module would have to be controlled. This would necessitate multiple versions of the software module and the attendant configuration control problems.

What is needed, therefore, is a system and method for processing data at forwarder interfaces that is modular and flexible, and that incurs minimal processing overhead so that only the necessary processing logic is implemented for any given interface.

BRIEF SUMMARY OF THE INVENTION

The invention described herein is a system and method for the processing of data that is organized as information transport elements, such as ethernet packets. At interfaces to a forwarder, software modules that implement packet processing logic are assigned per interface and per direction (i.e., inbound or outbound, relative to the forwarder). An interface represents logic that facilitates the connection between a communications channel and a forwarder, wherein the channel operates under a specific protocol and/or medium, such as the 802.11 wireless standard, or the universal serial bus (USB) standard. An interface can be implemented as software, hardware, or a combination thereof. At any given interface, a series of processing modules would be employed to process inbound packets; likewise, a set of processing modules would be used to process outbound packets. A given module may be used for both inbound and outbound packets and at multiple interfaces. For inbound packets, the modules allocated for inbound processing are generally executed in sequence when the packet is received from the interface, before sending the packet on to the forwarder. For packets that are outbound from the forwarder, the modules allocated for outbound processing are generally executed in sequence when the packet is sent by the forwarder, prior to any other processing, e.g., queuing to hardware.

Generally, when any given processing module executes, one of three results is attained. First, the packet can be discarded ("dropped") by the module, such that no further processing is performed. The packet resources (such as memory) can then be released to its source interface. Second, a packet may or may not be processed by a module, but can then be passed on for further processing to a subsequent module if there is such a module. Otherwise, the packet is sent to the forwarder in the inbound case, or out to the interface in the outbound case. Third, a packet can be consumed by a processing module, such that the packet is neither discarded nor passed on directly, but is redirected outside the normal flow of processing.

To assign processing modules to particular interfaces at a forwarder, a registration process is performed. This is generally performed during the system start-up process, at runtime. In an alternative embodiment of the invention, this can be performed after start-up, e.g., as a result of system configuration changes. Modules are assigned to a particular interface at a particular forwarder, and assigned to a specific direction (i.e. inbound or outbound, or both) at that interface. For any given interface and direction, modules are prioritized, so that a packet is processed by the modules sequentially, one module after the other, according to their priority. The highest priority module is applied, followed by the next highest, etc. As will be discussed below, priority can be predetermined or defined dynamically.

The invention has the advantage of allowing flexible configuration. Generally, a processing module can be effectively enabled or disabled at runtime. A processing module can also be assigned or deassigned from interfaces, and can have its priority changed at runtime. Moreover, a designer needs only to assign modules that are needed, where they are needed. Modules can also be assigned based on a specific system context or a specific hardware context. This permits the use of modules that take advantage of specific vendor features only in systems that use that vendor's product. A vendor can even provide his or her own processing module(s). This can be done without modifying the rest of the system. Vendor-specific modules are therefore not necessarily shared beyond the context of the vendor's product. Moreover, the invention permits easy reconfiguration if, for example, requirements change or new processing features are required. Such changes can be accommodated with minimal code change, and minimal risk of introducing bugs. The invention also has the advantage of allowing relatively easy maintenance, profiling, and debugging. A module will exist in a single directory, requiring minimal storage and allowing localized maintenance, even though they are executed by different interfaces (as determined during registration). Moreover, different processing modules can be enabled or disabled for testing purposes. The invention has the additional feature of permitting optimal operation. Only the needed software is stored and executed, and unnecessary modules are not executed. Hence, central processing unit (CPU) utilization is minimized.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

DETAILED DESCRIPTION OF THE INVENTION

A preferred embodiment of the present invention is now described with reference to the figures, where like reference numbers indicate identical or functionally similar elements. Also in the figures, the left-most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

I. Overview

The invention described herein is a system and method for processing data that is organized as information transport elements, such as ethernet packets. While the present description discusses the invention in terms of packets, note that the invention can also be used to perform analogous processing of information transport elements that are formatted according to any standard. The invention is not limited to packet transport, and applies to the processing of any formatted information transport element.

At interfaces to a forwarder, processing modules that implement packet processing logic are assigned per interface and per direction (i.e., inbound or outbound, relative to the forwarder). At any given interface, a series of modules would be implemented to process inbound packets; likewise, a set of modules would be present to process outbound packets. Note that a given processing module may incorporate both inbound and outbound processing, and may therefore handle both inbound and outbound packets. For inbound packets, the modules allocated for inbound processing are generally executed in sequence when the packet is received from the interface, before sending the packet on to the forwarder. For packets that are outbound from the forwarder, the modules allocated for outbound processing are generally executed in sequence when the packet is sent by the forwarder, prior to any other processing, e.g., queuing to hardware.

To assign modules to particular interfaces at a forwarder, a registration process is performed. This is performed during the system start-up process, at runtime. In an alternative embodiment of the invention, this can be performed after start-up, e.g., as a result of system configuration changes. Modules are assigned to a particular interface at a particular forwarder, and dedicated to a specific direction (i.e. inbound, outbound, or both) at that interface. For any given interface and direction, modules are prioritized, so that a packet is processed by the modules sequentially, one module after the other, according to their priority. In an embodiment of the invention, the highest priority module is applied, followed by the next highest, etc.

II. System

Figure 1:
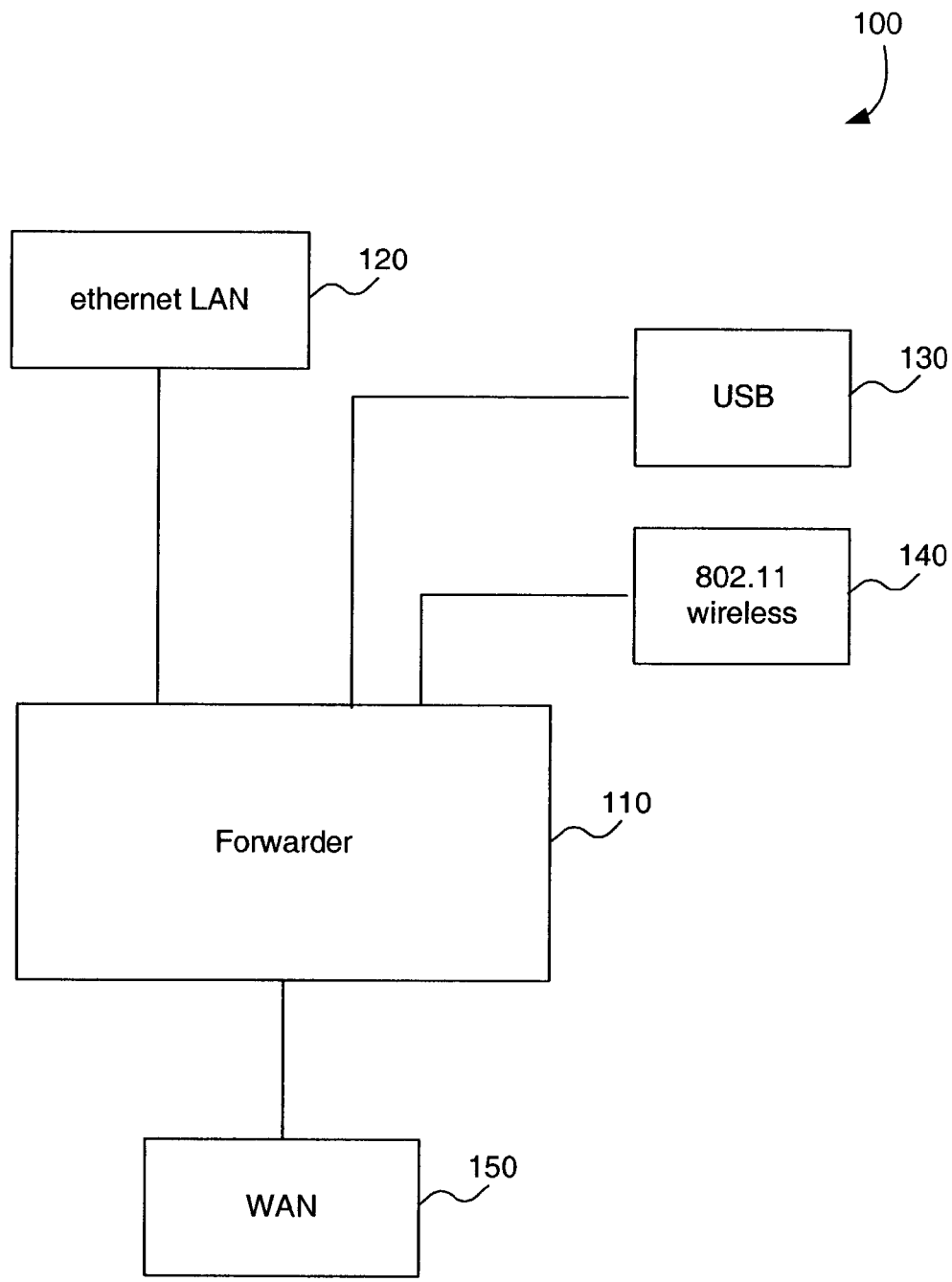
FIG. 1 is a block diagram illustrating an exemplary forwarder and its interfaces.
Figure 2:
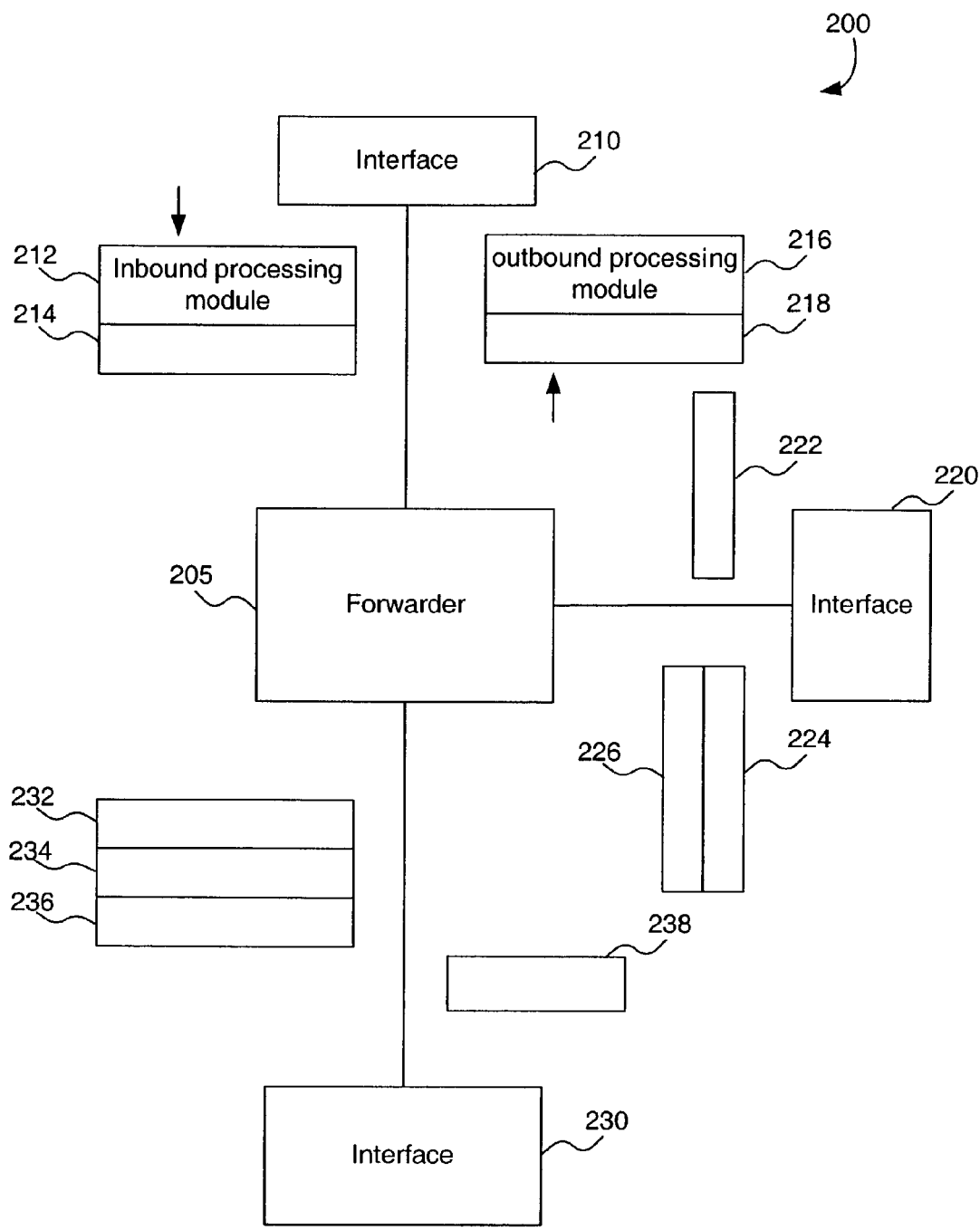
FIG. 2 is a block diagram illustrating a forwarder, its interfaces, and processing modules associated with the interfaces according to an embodiment of the invention.

The system of the invention, according to one embodiment, is illustrated generally in FIG. 2 as system 200. A forwarder 205 has interfaces 210, 220, and 230. Each interface has a set of inbound and outbound processes that represent execution of processing modules, where the notions of inbound and outbound are defined relative to forwarder 205. Interface 210, for example, has inbound processes 212 and 214. Interface 210 also has outbound processes 216 and 218. Interface 220 has inbound process 222 and outbound processes 224 and 226. Interface 230 has inbound process 238 and outbound processes 232, 234, and 236.

Generally, different interfaces to a forwarder can utilize different numbers and types of inbound and outbound processing modules. This is a result of the fact that different interfaces will have different packet processing requirements. The processing at an Ethernet LAN interface, for example, may differ from the processing required at a wireless interface. Moreover, the assignment of specific processing modules to specific interfaces will depend on the forwarder and its context. The processing requirements in the context of a cable modem will differ, for example, from the processing requirements in the context of a residential gateway.

Figure 3:
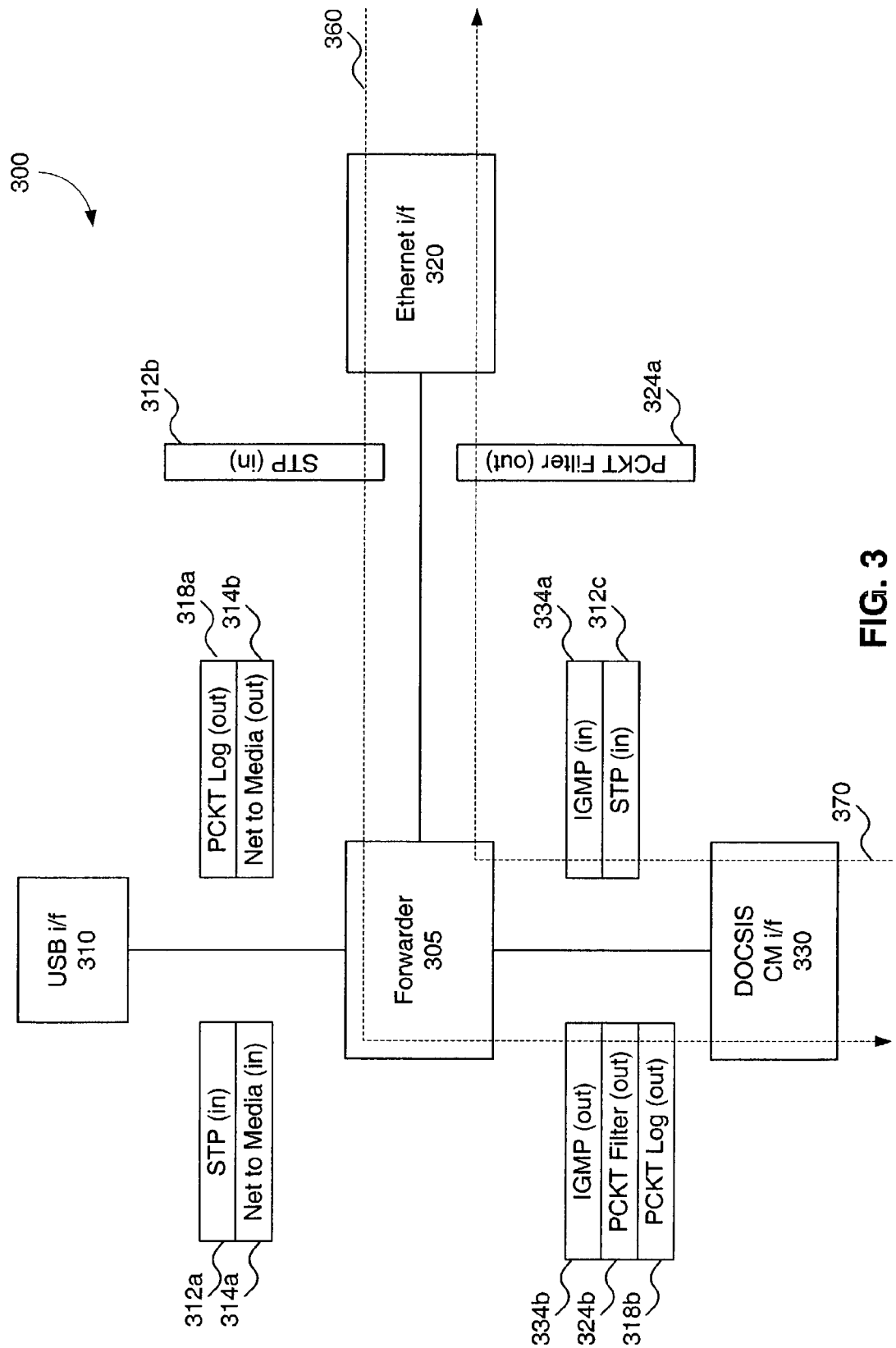
FIG. 3 is a block diagram illustrating examples of the kinds of processing modules that can be implemented in an embodiment of the invention.

A more detailed example of an embodiment of the invention is presented in FIG. 3 as system 300. In this example, forwarder 305 operates in the context of a cable communications system. Forwarder 305 has three interfaces. Interface 310 is a universal serial bus (USB) interface. Interface 320 is an ethernet interface. Interface 330 is a Data Over Cable System Interface Specification (DOCSIS) cable modem (CM) interface.

Interface 310 uses two processing modules for inbound packets. The first is a spanning tree protocol (STP) processing module. Note that the STP processing module is shown in FIG. 3 three times, as processes 312a, 312b, and 312c. This illustrates the fact that while there is a single STP processing module, it serves three roles in this example (inbound processing for each of interfaces 310, 320, and 330). This module looks for STP packets and discards them.

The second processing module for inbound packets at interface 310 is a net to media processing module. The net to media module handles the addition of entries to a net to media table for packets to or from the IP stack. This module actually operates in two capacities in this example, i.e., inbound and outbound processing for interface 310. Hence two different net to media processes are shown, 314a and 314b.

In addition to the net to media processing module, interface 310 also uses a packet logging module. If packet debugging is enabled, this module prints the packet, as well as the source/destination pair of interfaces, for debugging purposes. In addition to outbound packets at interface 310, this module handles outbound packets at interface 330 in this example. This module therefore corresponds to processes 318a and 318b in FIG. 3.

Interface 320 uses one inbound processing module and one outbound processing module. Process 312b corresponds to the STP processing module, as described above. This process is shown here to indicate its role in handling inbound packets at interface 320, in addition to inbound packets at interface 310. Interface 320 uses a packet filter processing module in the outbound direction. In the context of a DOCSIS system, for example, this module performs filtering according to DOCSIS requirements as stated in RFC2669. This may cause a packet to be discarded or passed along (possibly after having been modified), depending on the filters that are installed. In this example, the packet filter processing module corresponds to processes 324a and 324b, where the latter process handles outbound packets at interface 330.

Interface 330 uses two inbound processing modules, the STP processing module and an internet group multicast protocol (IGMP) processing module. Process 312c corresponds to the STP processing module, while process 334a corresponds to the IGMP processing module. The latter module handles IGMP sessions by creating encryption sessions for an IGMP stream. This module may delay the packet while a session is created. If an encryption session already exists, this module passes the packet on.

Interface 330 also uses three processing modules for outbound packets, the IGMP module, the packet filter module, and the packet logging module. The corresponding processes are shown in FIG. 3 as processes 334b, 324b, and 318b, respectively.

Two processing paths are also shown, both involving interfaces 320 and 330. In processing path 360, a packet enters interface 320 and is handled by process 312b, which represents execution of the STP processing module. Note that any processing module, when applied to an inbound packet, operates when the packet is received from the interface, before sending the packet on to a subsequent processing module or to the forwarder. In this case, the STP processing module looks to see if the incoming packet is an STP packet. If so, the packet is discarded. If the packet is not an STP packet, it is sent on to forwarder 305.

After leaving forwarder 305, the packet is processed by processes 334b, 324b, and 318b, in sequence. Process 334b, i.e., execution of the IGMP processing module, performs processing associated with a multicast operation. For example, if a new multicast group is being joined, the appropriate encryption keys must be established, etc. Process 324b represents execution of the packet filtering processing module as described above. Process 318b represents execution of the packet logging processing module, and therefore prints the packet and the associated source/destination pair if packet debugging is enabled. The packet is then sent out through interface 330. Note that outbound processing modules are applied when the packet is sent by forwarder 305, before any other processing, e.g., queuing to hardware.

FIG. 3 also shows the path of a packet that is inbound through interface 330 and that departs through interface 320. Such a packet follows path 370, through interface 330, to inbound processes 312c and 334a. Process 312c, representing execution of the STP processing module, looks to see if the inbound packet is an STP packet. If so, the packet is discarded. Process 334a, representing execution of the IGMP processing module, performs multicast session-related processing, as described above. The packet then proceeds to forwarder 305 and then to process 324a, which represents execution of the packet filter processing module. After process 324a performs the required packet filtering, the packet proceeds through interface 320.

Note that any processing module incorporates logic that, in general, results in one of three dispositions. A packet can either be discarded by a processing module, passed on, or consumed. In the case of discarding a packet, the packet is discarded without further processing. This may require that the packet resources be released back to the source interface, depending on where in the system it is being discarded.

If the packet is passed on, it is sent for further processing, either to the next module in sequence or to the next stage in the system (e.g., the forwarder, the outbound interface, etc.). Prior to being passed on by the module, the packet can be processed in some manner. For example, the packet may be modified, e.g., type of service bits or address information (such as an IP address) can be changed.

In the case of consumption of a packet, the packet is neither passed on directly nor discarded. Rather, consumption of a packet entails redirecting the packet outside the normal flow of processing. This can include delaying the packet until an operation is complete, at which point the packet is released to continue in the normal flow. For example, this is what the IGMP module does when creating an encryption session, as described above. Another example is the holding of a packet until sufficient information is obtained to allow further action. If a hardware address is not known, for instance, a packet is not sent on until the address is obtained. Consumption may include redirecting the packet to a different interface (in or outbound) to start a new processing flow on that interface, or it may include redirecting the packet to alternate logic where processing is completed. For example, a processing module may look for dynamic host control protocol (DHCP) packets. Such a packet would then be sent to an appropriate DHCP handler. Such a packet would not be sent on to a subsequent processing module, to a forwarder, or to an outbound interface.

The system of the invention can be implemented in software or a combination of hardware and software. Software embodiments can be implemented in any programming language, as would be apparent to one of ordinary skill in the art. In one embodiment, the invention can be implemented using C++. The design of logic for implementing a processing module would be apparent to a person of skill in the art.

III. Method

A. Operation

Figure 4:
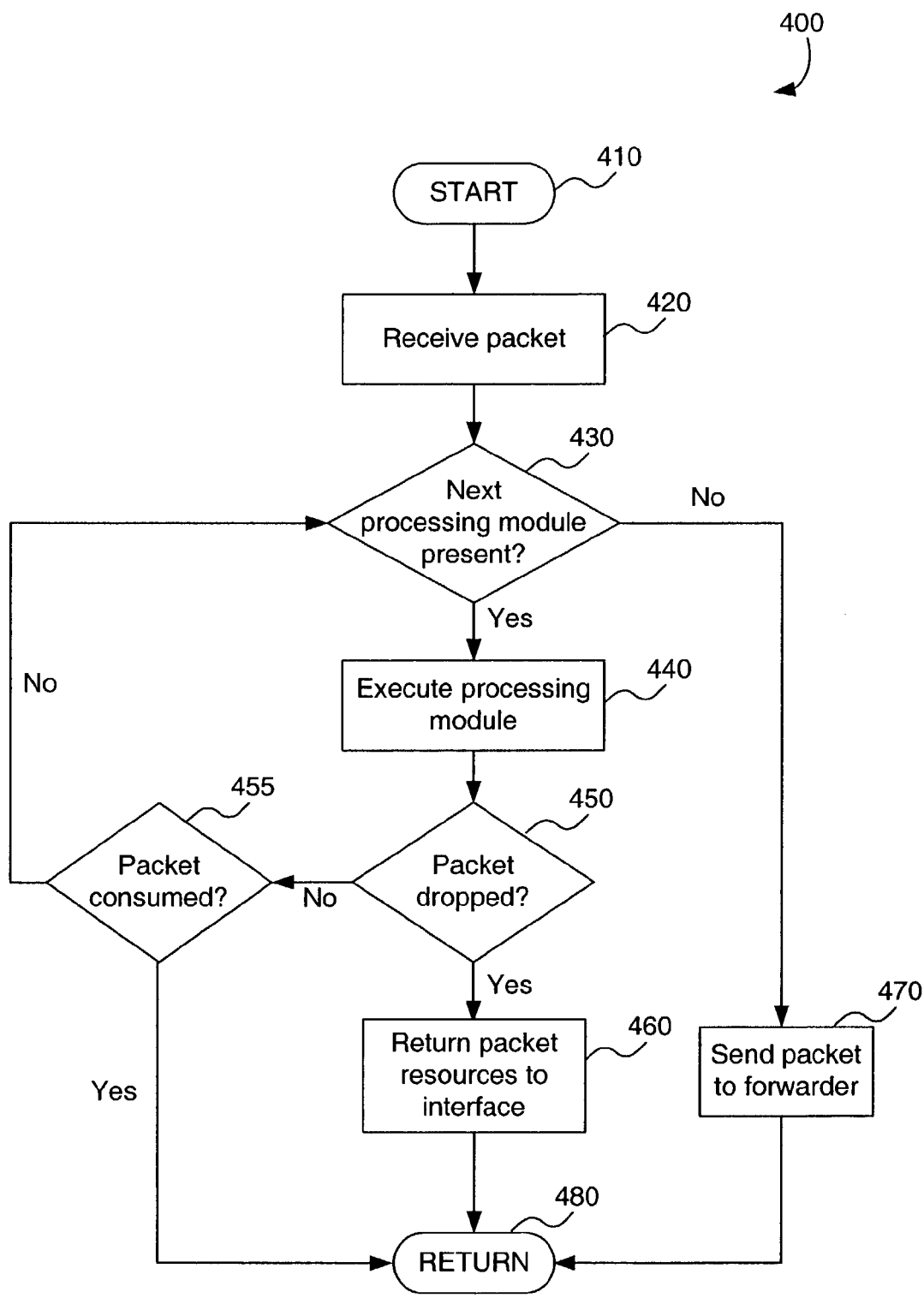
FIG. 4 is a flowchart illustrating the processing of inbound packets, according to an embodiment of the invention.

Processing of an inbound packet at an interface, according to an embodiment of the invention, is illustrated in FIG. 4 as flowchart 400. The flowchart begins at step 410. At step 420, the packet is received from the interface. At step 430, a determination is made as to whether an inbound processing module is to be executed. In an initial iteration, step 430 includes determination of the first module to be executed. In an embodiment of the invention, the highest priority processing module is chosen from among those modules assigned to the interface. In another embodiment of the invention, data that identifies the first processing module to be executed can be passed in when the packet is sent to the interface. In subsequent iterations, step 430 includes a determination of whether another processing module is to be executed. The identified processing module is executed in step 440.

In step 450, a determination is made as to whether the packet is to be discarded. If so, then in step 460, the packet resources (e.g., memory) are returned to the interface. If in step 450 the packet is not to be discarded, then a determination is made in step 455 as to whether the packet is to be consumed. If so, the process concludes at step 480. If not, the process returns to step 430. Here a determination is made as to whether a further processing module is to be executed. If so, the process proceeds to step 440. Otherwise, the process continues at step 470. In step 470, the packet is sent on to the forwarder, since there is no next processing module to be executed. The process concludes at step 480.

Figure 5:
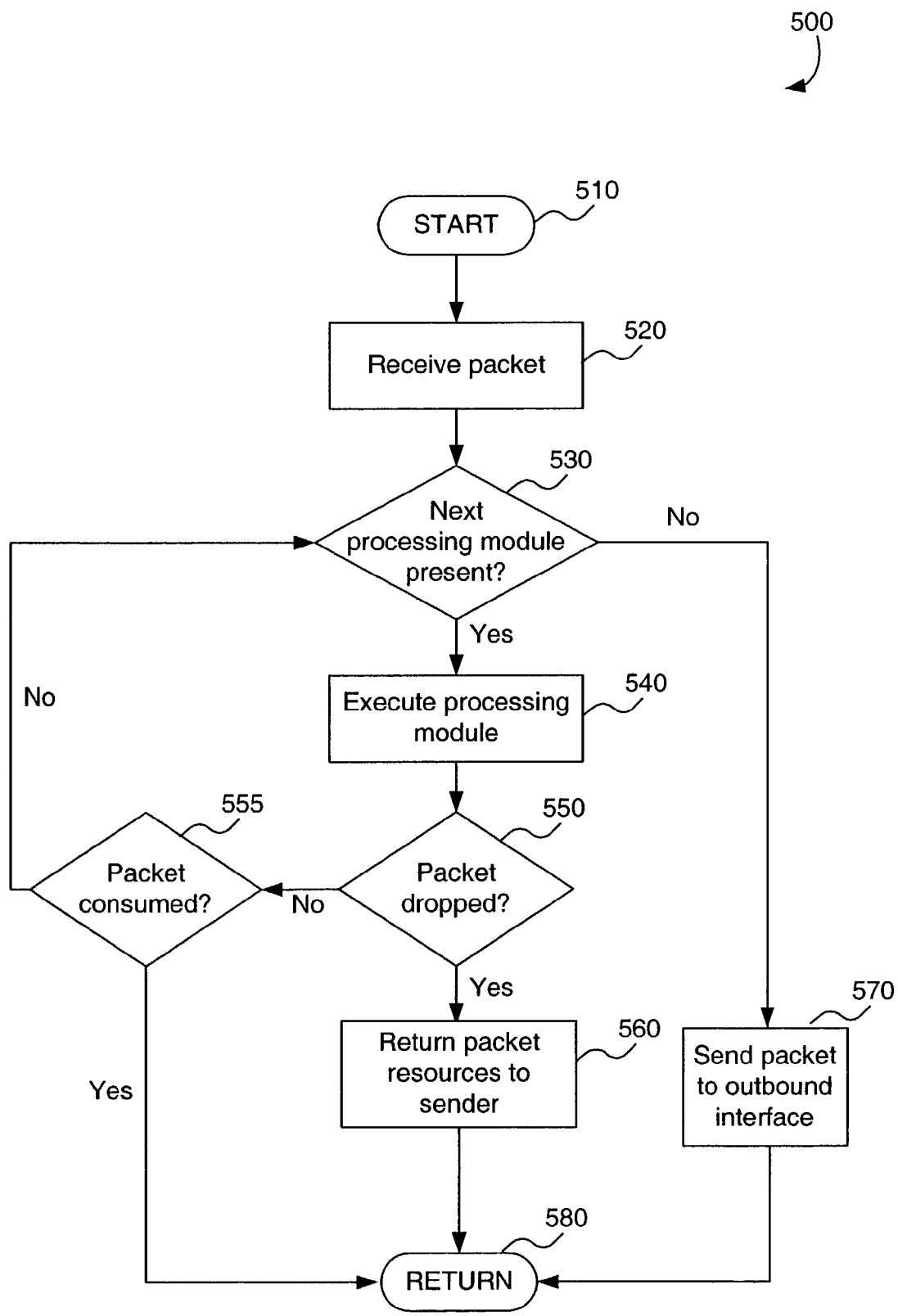
FIG. 5 is a flowchart illustrating the processing of outbound packets, according to an embodiment of the invention.

The method of processing an outbound packet is illustrated in FIG. 5 as flowchart 500. The process begins at step 510. In step 520, the packet is received from the forwarder. At step 530, a determination is made as to whether an outbound processing module is to be executed. In an initial iteration, step 530 includes determination of the first module to be executed. In an embodiment of the invention, the highest priority processing module is chosen from among those modules assigned to the interface. In another embodiment of the invention, data that identifies the first processing module to be executed can be passed in when the packet is received. In subsequent iterations, step 530 includes a determination of whether another processing module is to be executed. The process continues at step 540. Here, the identified processing module is executed.

In step 550, a determination is made as to whether the packet is to be discarded. If so, the packet resources (such as memory) are returned to the sender in step 560. The process then concludes at step 580. If in step 550 it is determined that the packet is not to be discarded, then the process continues at step 555. In this step, if it is determined that the packet is to be consumed, then the process concludes at step 580. Otherwise, the process returns to step 530, where a determination is made as to whether a further processing module is to be executed. If so, the process continues at step 540. Otherwise, the process continues at step 570, where the packet is sent to the outbound interface, since there is no further processing module to be executed. The process concludes at step 580.

B. Registration

Figure 6:
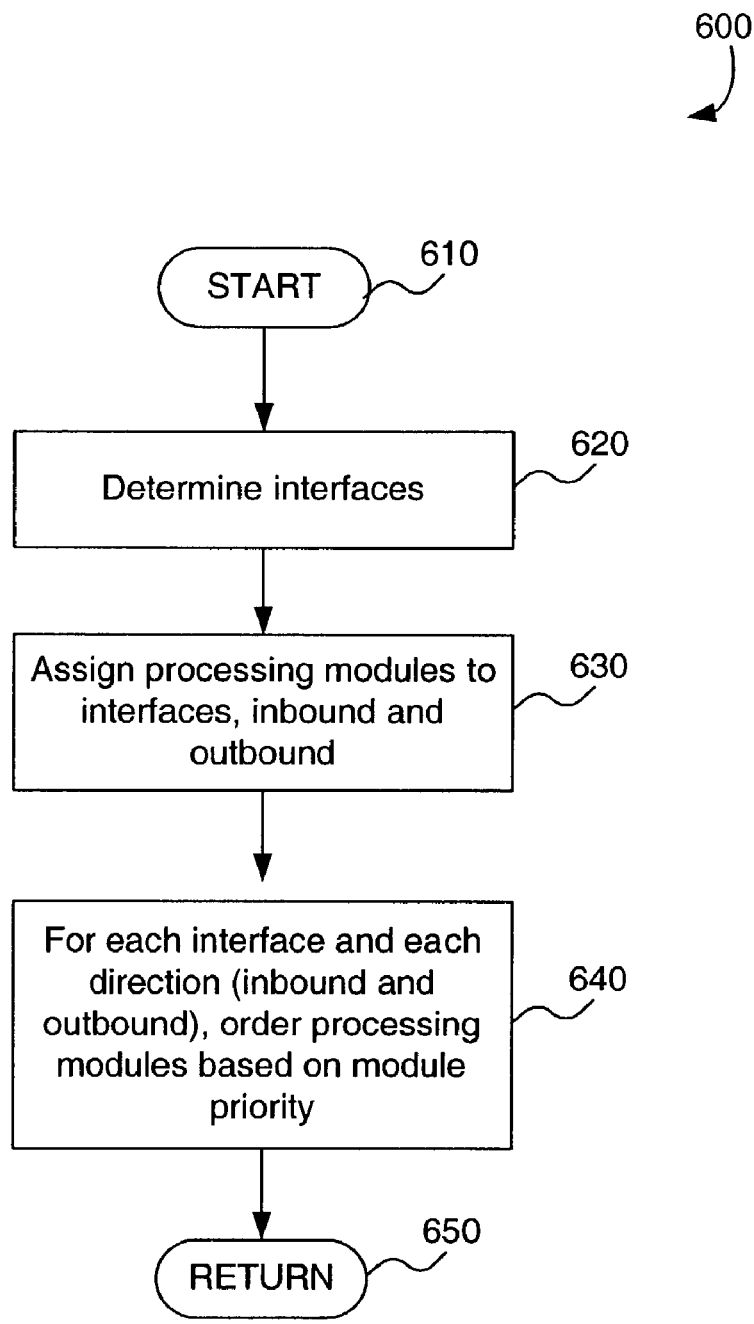
FIG. 6 is a flowchart illustrating the process of registering processing modules to one or more particular interfaces at a particular forwarder, according to an embodiment of the invention.

The process of registering particular processing modules with particular interfaces is illustrated in FIG. 6 as flowchart 600. The process begins at step 610. In step 620, the interfaces to a given forwarder are determined. In step 630, processing modules are assigned to each interface, on the inbound and/or on the outbound side of the interface. In step 640, for each interface and for each direction (i.e., in and outbound) the processing modules are placed in an order for execution, based on priority. Priority can be determined by a system designer based on any of several criteria. For example, certain processes may necessarily have to proceed in a certain order. In addition, some modules are likely to discard or consume a packet. It is more efficient to place such modules early in a sequence and give them a high priority. This saves computing resources, since subsequent modules are avoided in cases where a packet is discarded or consumed early on.

In an alternative embodiment of the invention, the order of execution of assigned processing modules can be determined dynamically, either during or subsequent to registration. In such an embodiment, after basic system initialization and configuration, a system component may read a configuration file or receive configuration information (via HTTP or SNMP, for example). This sets the operational parameters of the system, which can cause certain features implemented in one or more processing modules to be enabled or disabled, or cause the ordering of module execution to be changed.

The process concludes at step 650.

In another embodiment of the invention, one or more processing modules can be made available to a system after the system has been deployed. This would be generally analogous to downloading and installing an application on a personal computer.

IV. Computing Context

Figure 7:
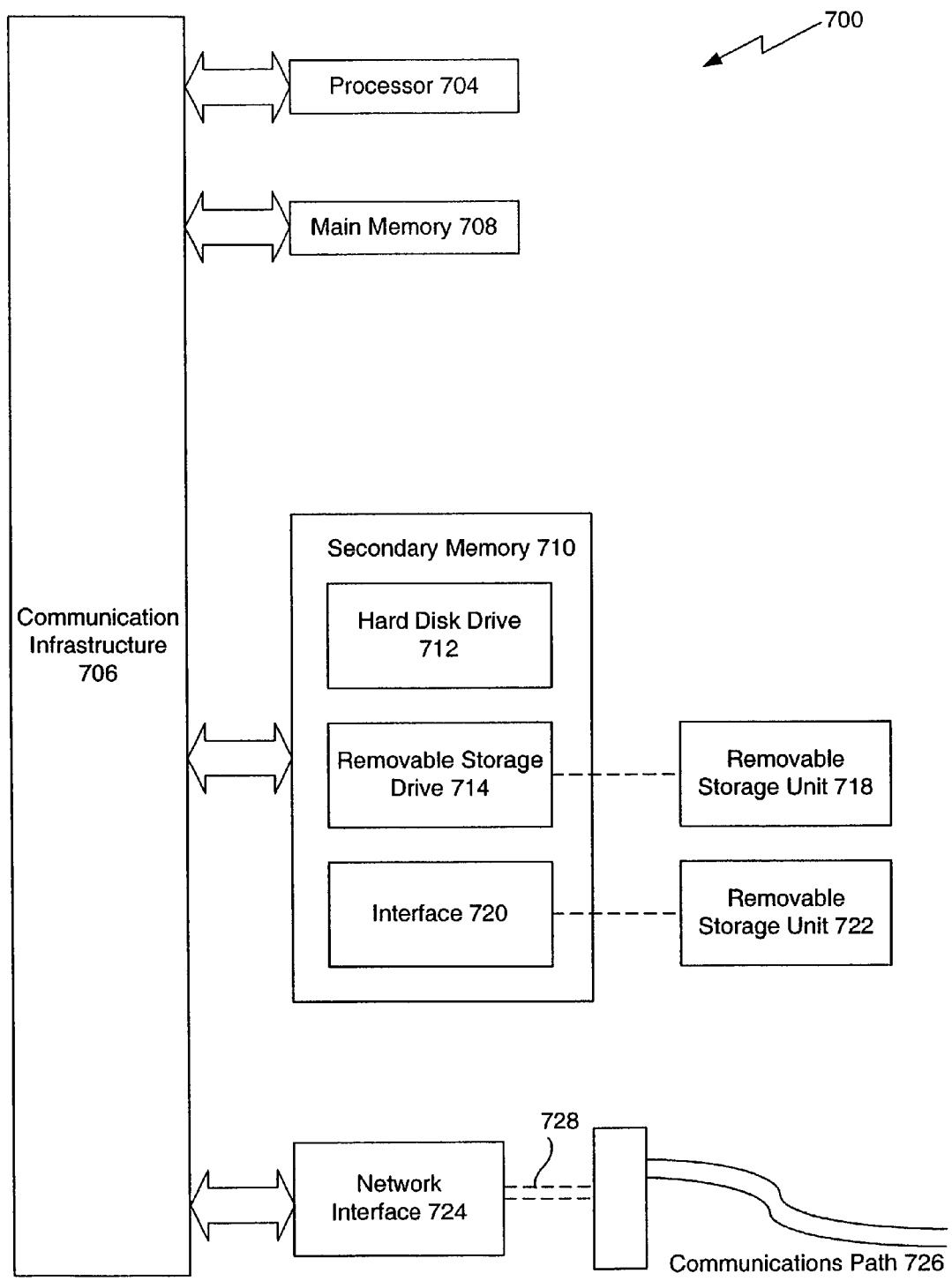
FIG. 7 is a block diagram of the computing environment for an embodiment of the invention.

The present invention may be implemented using software and may be implemented in conjunction with a computing system or other processing system. An example of such a computer system 700 is shown in FIG. 7. The computer system 700 includes one or more processors, such as processor 704. The processor 704 is connected to a communication infrastructure 706, such as a bus or network). Various software implementations are described in terms of this exemplary computer system. After reading this description, it will become apparent to a person skilled in the relevant art how to implement the invention using other computer systems and/or computer architectures.

Computer system 700 also includes a main memory 708, preferably random access memory (RAM), and may also include a secondary memory 710. The secondary memory 710 may include, for example, a hard disk drive 712 and/or a removable storage drive 714, representing a magnetic tape drive, an optical disk drive, etc. The removable storage drive 714 reads from and/or writes to a removable storage unit 718 in a well known manner. Removable storage unit 718, represents a magnetic tape, optical disk, or other storage medium which is read by and written to by removable storage drive 714. As will be appreciated, the removable storage unit 718 can include a computer usable storage medium having stored therein computer software and/or data.

In alternative implementations, secondary memory 710 may include other means for allowing computer programs or other instructions to be loaded into computer system 700. Such means may include, for example, a removable storage unit 722 and an interface 720. An example of such means may include a removable memory chip (such as an EPROM, or PROM) and associated socket, or other removable storage units 722 and interfaces 720 which allow software and data to be transferred from the removable storage unit 722 to computer system 700.

Computer system 700 may also include one or more communications interfaces, such as communications interface 724. Communications interface 724 allows software and data to be transferred between computer system 700 and external devices. Examples of communications interface 724 may include a modem, a network interface (such as an Ethernet card), a communications port, a PCMCIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path (i.e., channel) 726. This channel 726 carries signals 728 and may be implemented using wire or cable, fiber optics, an RF link and other communications channels. In an embodiment of the invention, signals 728 comprise data packets sent to processor 704. Information representing processed packets can also be sent in the form of signals 728 from processor 704 through communications path 726.

In this document, the terms "computer program medium" and "computer usable medium" are used to generally refer to media such as removable storage units 718 and 722, a hard disk installed in hard disk drive 712, and signals 728. These computer program products are means for providing software to computer system 700.

Computer programs (also called computer control logic) are stored in main memory 708 and/or secondary memory 710. Computer programs may also be received via communications interface 724. Such computer programs, when executed, enable the computer system 700 to implement the present invention as discussed herein. In particular, the computer programs, when executed, enable the processor 704 to implement the present invention. Accordingly, such computer programs represent controllers of the computer system 700. Where the invention is implemented using software, the software may be stored in a computer program product and loaded into computer system 700 using removable storage drive 714, hard drive 712 or communications interface 724.

V. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments.

What is claimed is:

1. A method of processing an inbound packet at one of a plurality of interfaces to a forwarder, comprising the steps of:
   a. assigning during a system start-up process at run time, to each of the interfaces, a set of processing modules, wherein each of the interfaces is adapted to a different communications protocol, and selection of the set of processing modules for each of the interfaces is based on packet processing requirements of the respective interfaces;
   b. receiving the packet from the one of the plurality of interfaces;
   c. determining if a first processing module is to be executed;
   d. if so, executing the first processing module;
   e. if the packet is discarded, returning packet resources to the one of the plurality of interfaces; and
   f. if the packet is neither consumed nor discarded, determining if a next processing module is to be executed and, if so, executing the next processing module before processing by the forwarder.

2. The method of claim 1, wherein the next processing module is determined on the basis of a predetermined priority order.

3. The method of claim 1, further comprising the step of:
   g. if the packet is neither consumed nor discarded, sending the packet to the forwarder.

4. A method of processing an outbound packet at one of a plurality of interfaces to a forwarder, comprising the steps of:
   a. assigning during a system start-up process at run time, to each of the interfaces, a set of processing modules, wherein each of the interfaces is adapted to a different communications protocol, and selection of the set of processing modules for each of the interfaces is based on packet processing requirements of the interface;
   b. receiving the packet from the forwarder;
   c. determining if a first processing module is to be executed;
   d. if so, executing the first processing module;
   e. if the packet is discarded, returning packet resources to an inbound interface through which the packet entered the forwarder;
   f. if the packet is neither consumed nor discarded, determining if a next processing module is to be executed and, if so, executing the next processing module.

5. The method of claim 4, wherein the next processing module is determined on the basis of a predetermined priority order.

6. The method of claim 4, further comprising the step of:
   g. if the packet is neither consumed nor discarded, sending the packet to the interface.

7. A system for processing an inbound packet at one of a plurality of interfaces to a forwarder, the system comprising a sequence of one or more processing modules that receives the packet from the one of the plurality of interfaces, such that said modules process the packet in turn until one of said modules in said sequence discards or consumes the packet, or if the packet is neither consumed nor discarded, a next processing module executes, if present, prior to processing by the forwarder,
   wherein each of the plurality of interfaces is adapted to a different communications protocol, and processing modules are assigned during a system start-up process at run time for each of the interfaces based on packet processing requirements of the respective interfaces.

8. A system for processing an outbound packet at one of a plurality of interfaces to a forwarder, the system comprising a sequence of one or more processing modules that receives the packet from the forwarder, such that said modules process the packet in turn until one of said modules in said sequence discards or consumes the packet, or if the packet is neither consumed nor discarded, a next processing module executes, if present, wherein each of the plurality of interfaces is adapted to a different communications protocol, and processing modules are assigned during a system start-up process at run time for each of the interfaces based on packet processing requirements of the interface.

9. A computer program product comprising a tangible computer usable medium having computer readable program code means embodied in said tangible medium for causing an application program to execute on a computer that processes an inbound packet at one of a plurality of interfaces to a forwarder, said computer readable program code means comprising:

a first computer program code means for assigning during a system start-up process at run time, to each of the interfaces, a set of processing modules, wherein each of the interfaces is adapted to a different communications protocol, and selection of the set of processing modules for each of the interfaces is based on packet processing requirements of the respective interfaces;

a second computer program code means for determining whether a first processing module is to be executed at the one of the plurality of interfaces;

a third computer program code means that embodies the first processing module, for processing the packet;

a fourth computer program code means for returning packet resources to the interface if the packet has been discarded;

a fifth computer program code means for determining whether a next processing module is to be executed at the one of the plurality of interfaces; and a sixth computer program code means that embodies the next processing module, for further processing the packet prior to processing by the forwarder, if the packet has been neither discarded nor consumed.

10. The computer program product of claim 9, further comprising:

a seventh computer program code means for determining the next processing module to be executed, on the basis of a predetermined priority order.

11. The computer program product of claim 9, further comprising:

an eighth computer program code means for dynamically determining the next processing module to be executed.

12. The computer program product of claim 9, further comprising:

a ninth computer program code means for sending the packet to the forwarder if the packet is neither consumed nor discarded.

13. A computer program product comprising a tangible computer usable medium having computer readable program code means embodied in said tangible medium for causing an application program to execute on a computer that processes an outbound packet at one of a plurality of interfaces to a forwarder, said computer readable program code means comprising:

a first computer program code means for assigning during a system start-up process at run time, to each of the interfaces, a set of processing modules, wherein each of the interfaces is adapted to a different communications protocol, and selection of the set of processing modules for each of the interfaces is based on packet processing requirements of the respective interfaces;

a second computer program code means for determining whether a first processing module is to be executed at the one of the plurality of interfaces;

a third computer program code means that embodies the first processing module, for processing the packet;

a fourth computer program code means for returning packet resources to an inbound interface through which the packet entered the forwarder, if the packet has been discarded;

a fifth computer program code means for determining whether a next processing module is to be executed at the one of the plurality of interfaces, if the packet has been neither discarded nor consumed; and a sixth computer program code means that embodies the next processing module, for further processing the packet.

14. The computer program product of claim 13, further comprising:

a seventh computer program code means for determining the next processing module to be executed, on the basis of a predetermined priority order.

15. The computer program product of claim 13, further comprising:

an eighth computer program code means for dynamically determining the next processing module to be executed.

16. The computer program product of claim 13, further comprising:

a ninth computer program code means for sending the packet to the interface if the packet is neither consumed nor discarded.

\* \* \* \* \*

UNITED STATES PATENT AND TRADEMARK OFFICE
CERTIFICATE OF CORRECTION

PATENT NO. : 7,613,133 B2  Page 1 of 1
APPLICATION NO. : 10/379801
DATED : November 3, 2009
INVENTOR(S) : Pullen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1227 days.

Signed and Sealed this

Nineteenth Day of October, 2010

David J. Kappos
*Director of the United States Patent and Trademark Office*